US007743346B2

(12) United States Patent
Kyle

(10) Patent No.: US 7,743,346 B2

(45) **Date of Patent: *Jun. 22, 2010**

(54) SYSTEM FOR MANAGING THE NAVIGATIONAL USABILITY OF AN INTERACTIVE MAP

(75) Inventor: Henry Martin Kyle, Coquitlam (CA)

(73) Assignee: Autodesk, Inc., San Rafael, CA (US)

( * ) Notice: Subject to any disclaimer, the term of this patent is extended or adjusted under 35 U.S.C. 154(b) by 188 days.

This patent is subject to a terminal disclaimer.

(21) Appl. No.: 11/846,496

(22) Filed: Aug. 28, 2007

(65) Prior Publication Data

US 2007/0294642 A1 Dec. 20, 2007

Related U.S. Application Data

(63) Continuation of application No. 10/814,946, filed on Mar. 30, 2004, now Pat. No. 7,269,801.

(51) Int. Cl.
*G06F 3/048* (2006.01)

(52) U.S. Cl. ....................... 715/855; 715/853; 715/854; 715/771; 715/788; 340/990; 340/995.1; 340/995.11; 340/995.15

(58) Field of Classification Search ......... 715/848–855, 715/762–763, 768, 771, 788, 790, 794, 839; 345/440–443; 702/3, 5; 340/990, 995.1, 340/995.11–995.28; 701/200–226; D21/351
See application file for complete search history.

(56) References Cited

U.S. PATENT DOCUMENTS

| | | | |
|---|---|---|---|
| 5,790,121 A | 8/1998 | Sklar et al. | |
| 5,948,040 A * | 9/1999 | DeLorme et al. | 701/201 |
| 6,104,410 A | 8/2000 | Wong | |
| 6,201,544 B1 * | 3/2001 | Ezaki | 345/419 |
| 6,219,050 B1 | 4/2001 | Schaffer | |
| 6,219,055 B1 * | 4/2001 | Bhargava et al. | 715/850 |
| 6,249,742 B1 | 6/2001 | Friederich et al. | |
| 6,339,747 B1 * | 1/2002 | Daly et al. | 702/3 |
| 6,405,129 B1 * | 6/2002 | Yokota | 701/208 |
| 6,854,091 B1 | 2/2005 | Beaudoin | |
| 7,315,985 B1 * | 1/2008 | Gauvin et al. | 715/734 |
| 2005/0090979 A1 * | 4/2005 | Branch | 701/213 |

* cited by examiner

*Primary Examiner*—Weilun Lo
*Assistant Examiner*—Rashedul Hassan
(74) *Attorney, Agent, or Firm*—Patterson & Sheridan, LLP

(57) ABSTRACT

A graphical user interface for graphically managing the navigational usability of an interactive map is described. In one embodiment, the graphical user interface includes a layer hierarchy having a first layer and a second layer. The graphical user interface also includes a first display range bar associated with the first layer and configured to show a range of map scales at which the first layer is displayed in the digitized map. In addition, the graphical user interface includes a second display range bar associated with the second layer and configured to show a range of map scales at which the second layer is displayed in the digitized map.

15 Claims, 4 Drawing Sheets

SYSTEM FOR MANAGING THE NAVIGATIONAL USABILITY OF AN INTERACTIVE MAP

CROSS-REFERENCE TO RELATED APPLICATIONS

This application is a continuation of U.S. patent application Ser. No. 10/814,946, filed Mar. 30, 2004 now U.S. Pat. No. 7,269,801. The aforementioned related patent application is herein incorporated by reference.

FIELD OF THE INVENTION

The present invention generally relates to data management and more particularly to a system for managing the navigational usability of an interactive map.

BACKGROUND

Computer-implemented geographic information systems are well known in the art and typically are configured to provide digitized maps to end-users that contain information pertaining to a wide variety of features such as lakes, rivers, roads, etc. In many instances, computer-implemented geographic information systems are configured to enable an end-user to perform searches for a particular location within a given digitized map and also to choose a scale at which the digitized map is displayed.

FIG. 1 illustrates a digitized map 100 of a portion of a county composed of individual layers of data, as is commonly found in the prior art. As shown, the digitized map 100 includes various categories of map features, such as a city 101, a lake 102, a river 103, a major road 104, a minor road 105 and a fire hydrant 106. The digitized map 100 also may include a visual scale 107 to indicate the relationship between a distance on the digitized map 100 and the actual distance. Typically, the digitized map 100 includes a different layer for each type of map feature displayed. For example, the digitized map 100 may include a layer to display various cities, such as the city 101, and another layer to display fire hydrants, such as the fire hydrant 106. To render the digitized map 100 at a particular map scale, a computer-implemented geographic information system usually superimposes the layers that are displayed at that map scale on top of one another in a predetermined order. A map-developer typically determines the order in which the layers are superimposed builds this information into the computer-implemented geographic information system. In addition, each layer also may include one or more graphics styles for representing the map feature associated with that layer at different map scale ranges or to indicate different conditions. For example, a layer for minor roads may have a first style (e.g., a thick line) for showing the minor road 105 on a zoomed-in or large-scale map and a second style (e.g., a thin line) for showing the minor road 105 on a small-scale map.

The map-developer determines the ranges of map scale at which each layer and associated graphics style(s) are displayed in the digitized map 100. For example, the map-developer may choose to show the minor road 105 only in local maps since presenting minor roadways on a small-scale map, such as a map of the entire United States, would be impractical. Conversely, showing the names of the country and state in a map of a small suburb would be inappropriate. The choices made by the map-developer regarding the map scale ranges for each layer directly affects the usability of the digitized map 100 because displaying too much detail may result in an unreadable map while displaying too little detail may render the map less useful. Further, since the time required to download the digitized map 100 to an end-user computing device directly relates to the amount of data required to generate the digitized map 100 at a particular map scale, the map-developer also needs to consider how the various data weights of the digitized map 100 at different map scales affect the navigational usability of the digitized map 100. For example, data weights that are too large may cause downloading delays if the available bandwidth to the end-user computing device is limited.

A given digitized map may include upwards of a hundred or more layers. When building such a map, the map-developer faces the difficult and tedious task of organizing and managing the data associated with all of the different layers of the map. Currently, map-developers manage the layer settings (including the associated display ranges and graphics styles) for each layer via individual dialog boxes. To globally organize all of the different layers of the map and the respective settings for those layers, however, map-developers oftentimes rely on spreadsheets or even paper and pencil. These tracking methods fail to provide an efficient visual organization of the layers of the digitized map, the ranges of map scales at which the various layers are displayed in the digitized map or the different graphics styles associated with the various layers of the digitized map. Further, these methods provide no way of sampling the digitized map to test its navigational usability.

Therefore, there is a need for a system that enables a map-developer to efficiently organize and manage the layers of a digitized map based on parameters such as the draw priority of the various layers, the graphics styles associated with each of the various layers and the ranges of map scale at which the various layers are displayed in the digitized map. Further, there is a need for a system that enables a map-developer to analyze data weights and transmission times of the digitized map at various map scales to determine the navigational usability of the digitized map.

SUMMARY

One embodiment of a graphical user interface configured to organize and manage the layers of a digitized map includes a layer hierarchy having a first layer and a second layer. The graphical user interface also includes a first display range bar associated with the first layer and configured to show a range of map scales at which the first layer is displayed in the digitized map. In addition, the graphical user interface includes a second display range bar associated with the second layer and configured to show a range of map scales at which the second layer is displayed in the digitized map.

One advantage of the disclosed graphical user interface and analyzer is that a map-developer may efficiently organize and manage the layers of a digitized map based on the draw priority of the various layers, the graphics styles associated with each of the various layers and the ranges of map scale at which the various layers are displayed in the digitized map. Another advantage is that a map-developer may analyze data weights and transmission times of the digitized map at various map scales to determine the navigational usability of the digitized map.

DETAILED DESCRIPTION

Figure 2:
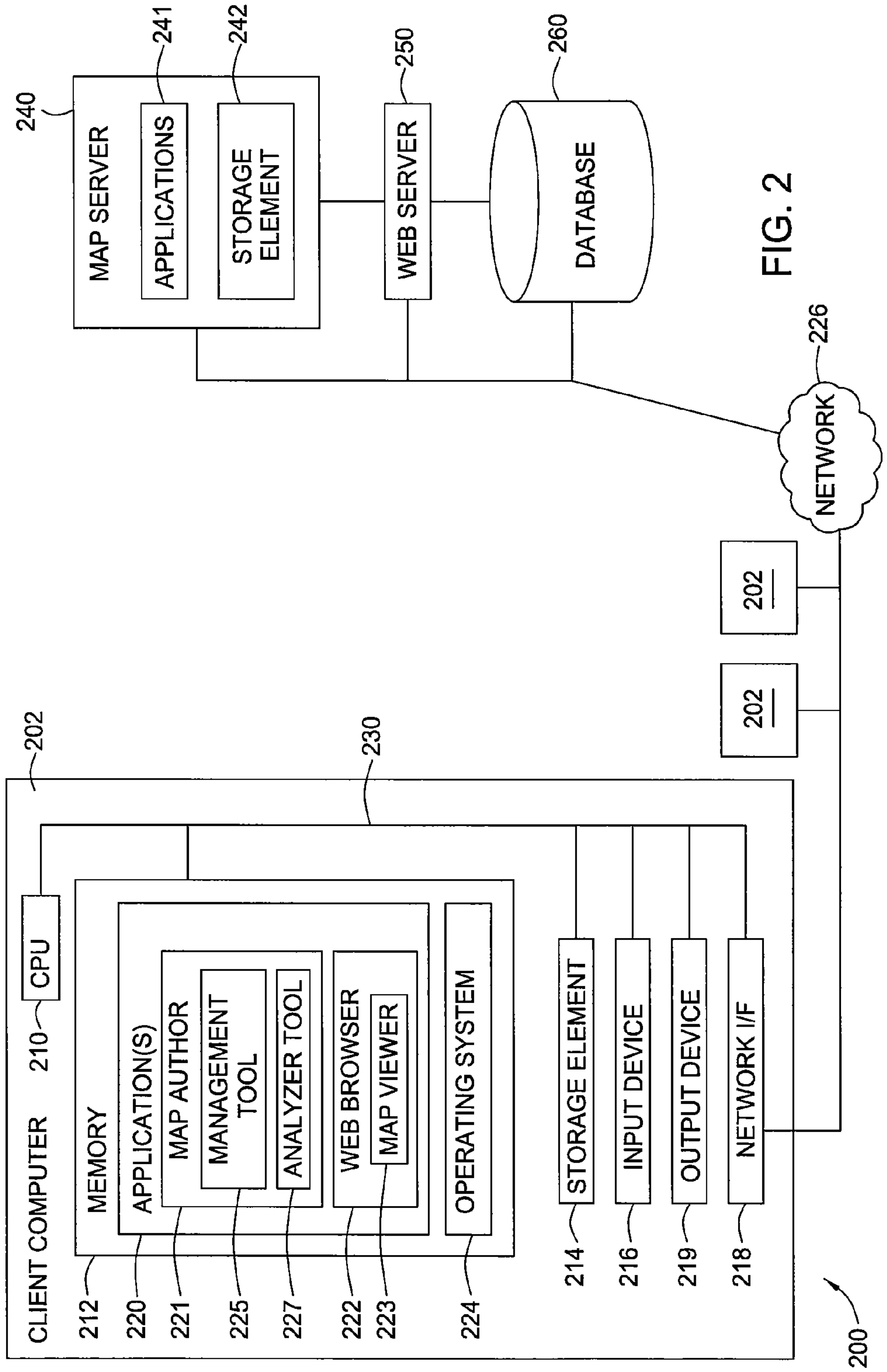
FIG. 2 is a conceptual block diagram illustrating a networked computer system, according to one embodiment of the invention.

FIG. 2 is a conceptual block diagram illustrating a networked computer system 200, according to one embodiment of the invention. As shown, the networked computer system 200 may include, without limitation, a client computer 202 that interacts with a map server 240, a web server 250 and a database 260 via a network 226. In general, the network 226 may be any type of network such as, for example, a local area network (LAN), a metropolitan area network (MAN), a wide area network (WAN) or the Internet.

The client computer 202 may comprise any type of computing device such as, for example, a server machine, a desktop computer, a lap-top computer, a set-top box, game system or console or a personal digital assistant (PDA). As illustrated, the client computer 202 generally includes a central processing unit (CPU) 210 connected via a bus 230 to a memory 212, a storage element 214, an input device 216, an output device 219 and a network interface device 218. The memory 212 may be a random access memory (RAM) device sufficiently large to hold the necessary programs and data structures associated with the invention. While the memory 212 is shown as a single entity, persons skilled in the art will understand that, in other embodiments, the memory 212 may comprise a plurality of modules and that the memory 212 may exist at multiple levels, from high-speed registers and caches to larger, lower-speed DRAM chips.

Figure 1:
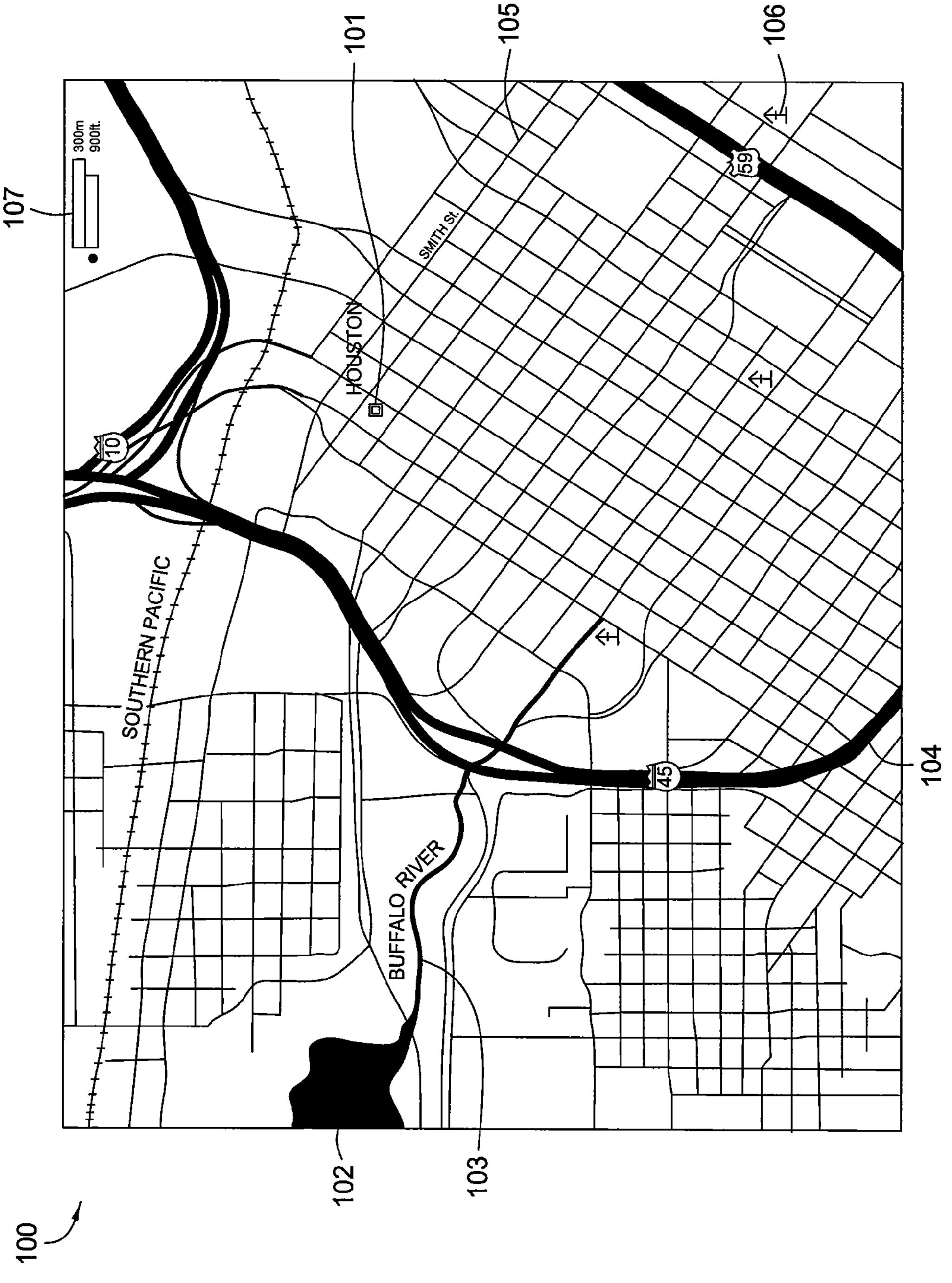
FIG. 1 illustrates a digitized map of a portion of a city composed of individual layers of data, as is commonly found in the art.

Illustratively, the memory 212 contains one or more applications 220. In one embodiment, the applications 220 include, without limitation, a map author 221, a web browser 222 and a map viewer 223. The map author 221 may be a map development software application utilized to create, modify and electronically display map window files that define a digitized map, such as the digitized map 100 of FIG. 1. In one embodiment, the map author 221 includes a management tool 225 for visually managing the various layers of a digitized map through a graphical user interface, such as a map organization layer diagram (not shown), described below in conjunction with FIG. 3. The map author 221 may further include an analyzer tool 227 for generating and graphically displaying sample data weights and transmission times of the digitized map, as described in further detail below in conjunction with FIG. 4. The web browser 222 enables the client computer 202 to communicate with the map server 240 through the network 226 and may include the map viewer 223 as a plug-in application. The map viewer 223 enables an end-user or a map-developer at the client computer 202 to access the digitized map and its associated data from the map server 240.

The memory 212 also contains an operating system 224. Examples of suitable operating systems 224 include, without limitation, Linux and Microsoft Windows® as well as any operating systems designed for handheld devices, such as Palm OS®, Windows® CE and the like. More generally, any operating system supporting the various functionalities disclosed herein may be implemented in conjunction with the invention.

The storage element 214 may be any storage device configured to allow storage of data utilized in connection with the one or more applications 220 and the operating system 224. In one embodiment, the storage element 214 comprises a direct access storage device. Although shown as a single unit, in alternative embodiments, the storage element 214 may be a combination of fixed and/or removable storage devices, such as fixed disc drives, floppy disc drives, tape drives, removable memory cards, or optical storage. Further, in other alternative embodiments, the memory 212 and the storage element 214 may be part of one virtual address space spanning multiple primary and secondary storage devices.

The input device 216 may be any device configured to input data or instructions to the client computer 202, such as, for example, a keyboard, keypad, light-pen, touch-screen, trackball, or speech recognition unit, audio/video player, and the like. The output device 219 may be any device configured to provide output to the user of client computer 202, such as, for example, any type of conventional display screen. Although shown separately from the input device 216, in alternative embodiments, the output device 219 and the input device 216 may be combined into one element. For example, the client computer 202 may include touch-screen or a display with an integrated keyboard for inputting data into the client computer 202.

The network interface device 218 may be any entry/exit device configured to allow network communications between the client computer 202 and the server 204 via the network 226. For example, the network interface device 218 may be a network adapter or other network interface card. Optionally, the network interface device 218 may comprise any suitable wireless interface to provide a wireless connection to the network 226.

The map server 240 may be any type of standard server containing software applications configured to respond to map data requests from users of the client computer 202. Typically, an application programming interface (not shown) facilitates communications between the map server 240 and applications running on the client computer 202. The map server 240 works in conjunction with the map author 221 and the map viewer 223 on the client computer 202 to create and deliver digitized maps to the client computer 202.

The web server 250 provides a connection point for the client computer 202 to request information from the map server 240 and the database 260 over the network 226. The database 260 is a repository for the map-related data used by the map server 240. In one embodiment, the database 260 may be implemented as a relational database that accommodates different types of map data (e.g., map attributes and map geometries). In other embodiments, the database 260 may be implemented as an XML database or an object-relational database or formatted files.

Embodiments of the invention may be implemented as application products for use with the networked computer system 200 to support map development and, more particularly, to provide a means for graphically organizing and managing the various layers of a digitized map. The programs of the application product may be contained on a variety of signal-bearing media. Illustrative signal-bearing media include, but are not limited to, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functionalities of the invention, represent exemplary, but not limiting, embodiments of the invention.

In general, the routines executed to implement the embodiments of the invention, may be part of an operating system or a specific application, component, program, module, object, or sequence of instructions. The software of the invention typically is comprised of a multitude of instructions that will be translated by the native computer into a machine-readable format and hence executable instructions. Also, programs are comprised of variables and data structures that either reside locally to the program or are found in memory or on storage devices.

While the foregoing describes one system in which the invention may be implemented, persons skilled in the art will recognize that, in alternative embodiments, the invention may be implemented on any type of a stand-alone (not networked) computing device or equivalent system containing the components necessary to implement the various functionalities described herein. Persons skilled in the art will therefore understand that the hardware environment depicted in conjunction with the network computer system 200 in no way limits the scope of the invention.

Figure 3:
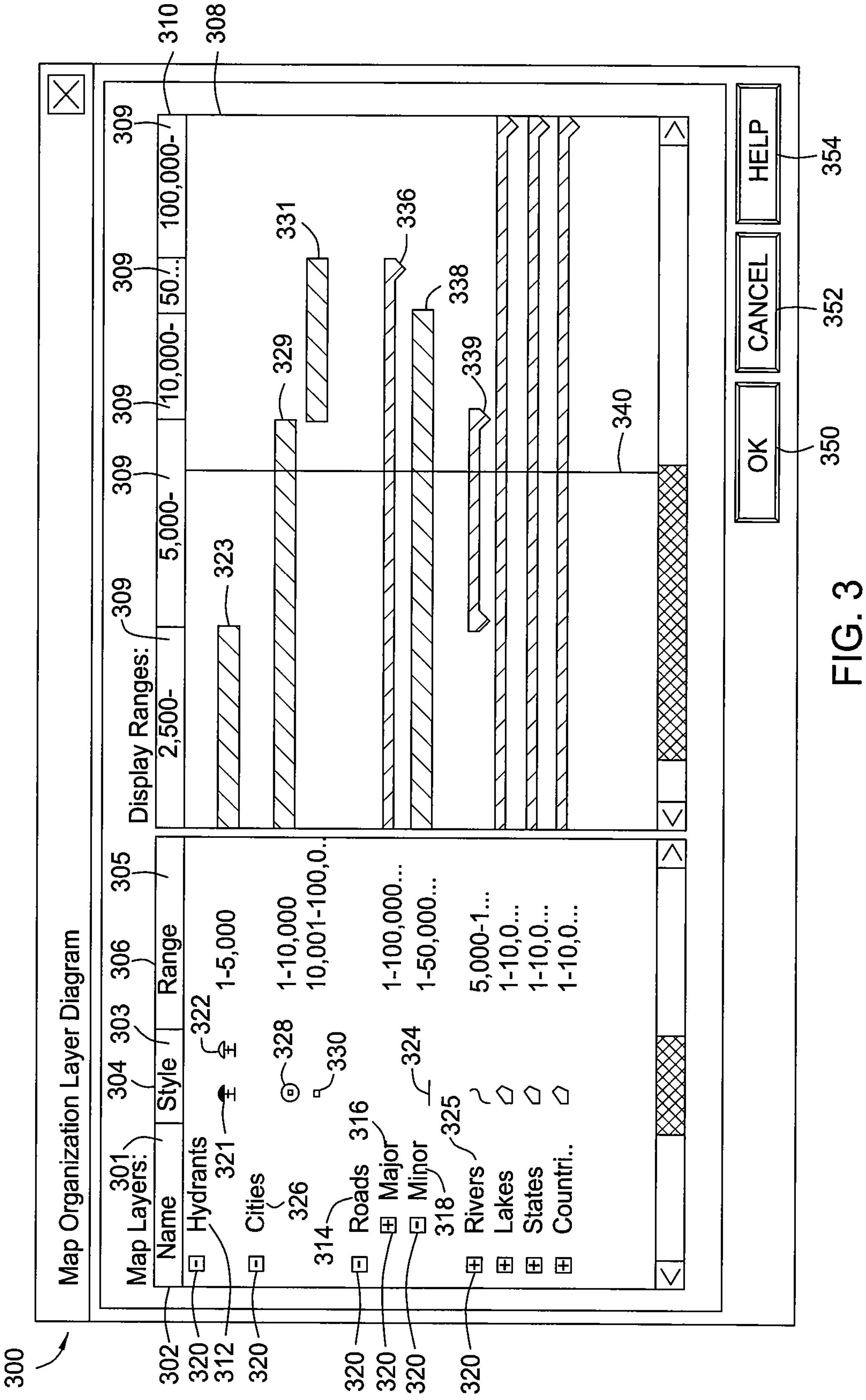
FIG. 3 illustrates a map organization layer diagram, according to one embodiment of the invention.

FIG. 3 illustrates a map organization layer diagram (MOLD) 300, according to one embodiment of the invention. The MOLD 300 comprises a graphical user interface configured to display different types of information about the various layers of a digitized map, such as map 100 of FIG. 1, and may be used by a map-developer to organize and manage the various layers of the digitized map. As described in further detail herein, the MOLD 300 generally sets forth the different layers of the digitized map, the different map scales at which each such layer appears in the digitized map as well as the various graphics styles used to represent the map feature associated with each such layer. In addition, the MOLD 300 may be used to organize the layers of the digitized map in a hierarchical structure to communicate more precisely the relationships among the various layers of the digitized map.

As shown, the MOLD 300 may include, without limitation, a name column 302, a style column 304, a range column 306 and a bar chart 308 with a current scale indicator 340. The name column 302 is configured to enable a map-developer to create a hierarchical ordering of the different layers of a digitized map. More specifically, in one embodiment, the name column 302 may be configured to display "layer groups," "sub-layer groups" and "layers." A layer group resides at the top of the layer hierarchy and may be subdivided into layers and/or sub-layer groups. In one embodiment, each layer group in the name column 302 corresponds to a generalized feature displayed in the digitized map. For example, a Roads layer group 314 corresponds to all of the roads displayed in the digitized map.

A sub-layer group resides in the middle of the layer hierarchy and may be subdivided into layers and/or additional sub-layer groups. In one embodiment, each sub-layer group in the name column 302 corresponds to a subset of either a layer group or another sub-layer group. For example, a Major sub-layer group 316 is a subset of the Roads layer group 314 and corresponds to all of the major roads displayed in the digitized map. Persons skilled in the art will understand that further dividing a sub-layer group into additional sub-layer groups creates another level in the layer hierarchy set forth in the name column 302 and that a map-developer may create as many levels of sub-layer groups as is necessary to organize the layers of the digitized map as desired.

A layer resides at the bottom of the layer hierarchy and may not be further subdivided into layers or sub-layer groups. In one embodiment, each layer in the name column 302 corresponds to a specific type of map feature that is displayed in the digitized map. For example, a Hydrants layer 312 includes all of the various fire hydrants displayed in the digitized map, a Cities layer 326 includes all of the various cities displayed in the digitized map and a Minor layer 318 includes all of the various minor roads displayed in the digitized map.

As previously described herein, the digitized map is rendered by superimposing each layer in the layer hierarchy on top one other in a predetermined order. In one embodiment, the name column 302 is configured to display the layers of the digitized map in the reverse order of the order in which the layers are superimposed on top of one another to render the digitized map. For example, when rendering a digitized map at the scale of 1:2,000, the Cities layer 326 would be superimposed on top of one or more layers organized under the Roads layer group 314, and then the Hydrants layer 312 would be superimposed on top of the Cities layer 326. In alternative embodiments, the name column 302 may be configured to display the different layers of the digitized map in any sort of order other than the layer draw order.

As also shown in FIG. 3, hierarchical icons (or "layer nodes") 320 are utilized to facilitate management of the layer hierarchy set forth in the name column 302. Each layer group, sub-layer group and layer in the name column 302 may be thought of as a "node" in the layer hierarchy, and each such node is assigned a different hierarchical icon 320. When collapsed, a given hierarchical icon 320 appears as a plus (+) sign, and only the layer group, sub-layer group or layer associated with that hierarchical icon 320 appears in the name column 302. For a node that is a layer group or a sub-layer group, a (+) sign indicates that a combination of two or more layers and/or sub-layer groups is organized under that node. For example, if the hierarchical icon 320 for the Roads layer group 314 were collapsed, the (+) sign would indicate that the Major sub-layer group 316 and the Minor layer 318 are organized under the Roads layer group 314. Similarly, the fact that the hierarchical icon 320 for the Major sub-layer group 316 is collapsed indicates that a combination of one or more layers and/or sub-layer groups is organized under the Major sub-layer group 316. As is described in further detail herein, for a node that is a layer, a (+) sign indicates that one or more graphics styles are used to represent the map feature associated with that layer in the digitized map. For example, if the hierarchical icon 320 for the Cities layer 326 were collapsed, the (+) sign would indicate that a city icon 328 and a city icon 330 are used to represent the various cities in the Cities layer 326 in the digitized map.

When expanded, a given hierarchical icon 320 appears as a minus (−) sign. For a node that is a layer group or a sub-layer group, when the hierarchical icon 320 associated with that node is expanded, each sub-layer group and/or layer organized directly under the node (i.e., the next level down in the layer hierarchy) appears in the name column 302. For example, as shown in FIG. 3, since the hierarchical icon 320 associated with the Roads layer group 314 is expanded, the Major sub-layer group 316 and the Minor layer 318 appear in the name column 302. As is described in further detail herein, for a node that is a layer, when the hierarchical icon 320 associated with that node is expanded, each graphics style used to represent the map feature associated with that layer in the digitized map appears in conjunction with the layer in the MOLD 300. For example, as shown in FIG. 3, since the hierarchical icon 320 associated with the Cities layer 326 is expanded, the city icon 328 and the city icon 330 appear in conjunction with the Cities layer 326 in MOLD 300.

Persons skilled in the art will recognize that the functionality associated with collapsing and expanding the hierarchical icons 320 is similar to that provided by well known file management applications such as Microsoft® Windows Explorer.

The style column 304 is configured to display a graphical representation of the map feature associated with each layer of the digitized map. Each such graphical representation may comprise any type of visual variable, including, but not limited to, icons, patterns or designs of any shape, color, orientation, texture, size, hue, saturation and the like. For example, differently shaped city icons 328 and 330 may be used to represent the various cities in the Cities layer 326, thin lines 324 of a particular color may be used to represent the minor roads in the Minor layer 318 and thicker lines of different colors may be used to represent the various types of major roads in the layers organized under the Major sub-layer group 316.

The map feature associated with a given layer may be graphically represented by either a single graphics style or by a set of two or more graphics styles. For example, a minor road icon 324 may be used to represent the minor roads in the Minor layer 318. By contrast, the hydrant icon 321 and the hydrant icon 322 may be used to represent different types of fire hydrants in the Hydrant layer 312. For example, the hydrant icon 321 may be green and may represent fire hydrants that have a lower water pressure level and flow rate, and the hydrant icon 322 may be red and may represent fire hydrants that have a higher water pressure level and flow rate.

In addition, as described in further detail herein, for each set of graphics styles used to represent a given map feature, a single display range may be common to all of the graphics styles within the set, or each graphics style within the set may have an individualized display range. For example, the hydrant icon 321 and the hydrant 322 have a common display range of 1:1 to 1:5,000. Thus, both the hydrant icon 321 and the hydrant icon 322 are used to represent the various fire hydrants in the Hydrants layer 312 at every map scale within this display range. By contrast, the display range for the city icon 328 is 1:1 to 1:10,000, and the display range for the city icon 330 is 1:10,001 to 1:100,000. Thus, when the digitized map is rendered at a scale falling within the former display range, the city icon 328 is used to represent the various cities in the Cities 326 layer, but when the digitized map is rendered at a scale falling with the latter display range, the city icon 330 is used to represent the various cities in the Cities 326 layer.

Persons skilled in the art will understand that the MOLD 300 may be configured to include one or more graphical representations (or graphics styles) for any type of feature that may be included in any type of digitized map.

The bar chart 308 is configured to provide a graphical representation of the display ranges 310 of the various nodes of the layer hierarchy set forth in name column 302. (Note that a display range is referred to herein as the range of map scales for which the elements organized under a given node are displayed in the digitized map.) As shown, the bar chart 308 may include, without limitation, summary bars and display range bars. If a hierarchical icon 320 of a node in the layer hierarchy is collapsed, then the bar chart 308 includes a summary bar corresponding to that node. If the node is a layer group or a sub-layer group, then the summary bar is configured to indicate the display range(s) of the layers and/or sub-layer groups organized under that node. For example, since the hierarchical icon 320 of the Major sub-layer group 316 is collapsed, the bar chart 308 includes a summary bar 336 indicating that the layers and/or sub-layer groups organized under the Major sub-layer group 316 have an aggregate display range of 1:1 to 1:100,000. Similarly, since the hierarchical icon 320 of a Rivers layer group 325 is collapsed, the bar chart 308 includes a summary bar 339 indicating that the layers and/or sub-layer groups organized under the Rivers layer group 325 have an aggregate display range of 1:5,000 to 1:10,000.

If the node is a layer, then the summary bar is configured to indicate the display range(s) of the graphics styles used to represent the map feature associated with that layer in the digitized map. For example, if the hierarchical icon 320 of the Hydrants layer 312 were collapsed, then the bar chart 308 would include a summary bar corresponding to that node indicating that the hydrant icon 321 and the hydrant icon 322 have an aggregate display range of 1:1 to 1:5,000 (where each icon has a common display range, as previously described herein). Similarly, if the hierarchical icon 320 of the Cities layer 326 were collapsed, then the bar chart 308 would include a summary bar corresponding to that node indicating that the city icon 328 and the city icon 330 have an aggregate display range of 1:1 to 1:100,000 (where the city icon 328 has an individualized display range of 1:1 to 10,000, and the city icon 330 has an individualized display range of 1:10,001 to 1:100,000, as previously described herein).

If a hierarchical icon 320 of a node in the layer hierarchy is expanded, and the node is a layer group or a sub-layer group, then the bar chart 308 includes neither a summary bar nor a display range bar for that node. For example, since the hierarchical icon 320 of the Roads layer group 316 is expanded, the bar chart 308 does not include either a summary bar or a display range bar for that node. Similarly, if the hierarchical icon 320 of the Major sub-layer group 316 were expanded, then the bar chart 308 would not include the summary bar 336. Again, the bar chart 308 would not include any type of bar, either a summary bar or a display range bar, for that node.

If a hierarchical icon 320 of a node in the layer hierarchy is expanded, and the node is a layer, then the bar chart 308 includes a display range bar corresponding to each graphics style associated with that layer having an individualized display range and to each set of graphics styles associated with that layer having a common display range. Each such display range bar is configured to indicate either the individualized display range for each such graphics style or the common display range for each such set of graphics styles. For example, since the hierarchical icon 320 of the Hydrants layer 312 is expanded, and the hydrant icon 321 and the hydrant icon 322 have a common display range, the bar chart 308 includes a display range bar 323 indicating that the common display range is from 1:1 to 1:5,000. Since the hierarchical icon 320 of the Cities layer 326 is expanded, and the city icon 328 and the city icon 330 have individualized display ranges, the bar chart 308 includes a display range bar 329 indicating that the individualized display range of the city icon 328 is from 1:1 to 1:10,000, and the individualized display range of the city icon 330 is from 1:10,001 to 1:100,000. Similarly, since the hierarchical icon 320 of the Minor layer 318 is expanded, and the minor roads icon 324 has an individualized display range, the bar chart 308 includes a display range bar 338 indicating that the individualized display range is from 1:1 to 1:50,000.

In alternative embodiments, the bar chart 308 may be configured to include summary bars corresponding to each node in the layer hierarchy, even when the hierarchical icons 320 of those nodes are expanded. For example, the bar chart 308 may be configured to include a summary bar corresponding to the Cities layer 326 indicating that the city icon 328 and city icon 330 have an aggregate display range of 1:1 to 1:100,000. Similarly, the bar chart may be configured to include a summary bar corresponding to the Roads layer group 314 indicating that the layers and sub-layer groups organized under the Roads layer group 314 have an aggregate display range of 1:1 to 1:100,000. Persons skilled in the art will understand that in such embodiments the bar chart 308 may include a summary bar for each node in the layer hierarchy set forth in the name column 302.

The range column 306 is configured to display numerical values for the display ranges associated with each summary bar or display range bar included in the bar chart 308. For example, the range column 306 indicates the display range associated with the summary bar 336 is from 1:1 to 1:100,000. Similarly, the range column 306 indicates that the display range associated with the display range bar 329 is from 1:1 to 1:10,000 and that the display range associated with the display range bar 331 is from 1:10,001 to 1:100,000.

The current scale indicator 340 may be used to determine the layers and styles that are displayed in the digitized map at a particular map scale. More specifically, the map-developer may align the current scale indicator 340 with a given map scale included in the display ranges 310 and may visually inspect the bar graph 308 to determine which display range bars included in the bar graph 308 are intersected by the current scale indicator 340. The intersected display range bars correspond to the layers that are displayed in the digitized map at the selected map scale and indicate the graphics style used to represent the map feature associated with each of those layers at the selected map scale. For example, as shown in FIG. 3, the current scale indicator 340 aligns with a map scale of 1:8,000 and intersects the display range bar 329 and the display range bar 338. Thus, at this map scale, the map-developer understands that the Cities layer 326 and the Minor layer 318 are displayed in the digitized map. The map-developer further understands that at this map scale the city icon 328 is used to represent the cities in the digitized map and that the minor roads icon 324 is used to represent the minor roads in the digitized map. Aside from allowing map-developers to determine which layers are presented at a particular scale, selecting and dragging the current scale indicator 340 changes the current display scale of the digitized map. For example, if the current scale indicator 340 is positioned at 1:10,000, the map-developer views the map at a scale of 1:10,000 in the map development application.

Persons skilled in the art will recognize that if the map-developer expands every hierarchical icon 320 included in the layer hierarchy set forth in name column 302, then the map-developer may determine every layer and associated graphics style that is displayed in the digitized map at the selected map scale. In addition, persons skilled in the art will understand that by moving the current scale indicator 340, the map-developer may determine the layers and styles displayed in the digitized map at a different map scale.

As described in further detail below in conjunction with Tables 1-3, the MOLD 300 is configured to enable the map-developer to interact with the layer hierarchy in the name column 302, the graphics styles in the style column 304, the display ranges in the range column 306, the summary and display range bars in the bar chart 308 and the current scale indicator 340 to organize and modify the various layers of the digitized map. For example, a Name tab 301 is configured to enable the map-developer to define and edit the different layer groups, sub-layer groups and layers set forth in the name column 302, a Style tab 303 is configured to enable the map-developer to define and edit the different graphics styles in the style column 304, a Range tab 305 is configured to enable the map-developer to define and edit the display ranges set forth in the range column 306 and display range tabs 309 are configured to enable the map-developer to define and edit the different subsets of display ranges 310. Further, the different graphical elements of the MOLD 300 (e.g., the graphics styles, the summary bars and the display range bars) are configured to be modified by the map-developer through input devices, such as a mouse, a keyboard and the like. In addition, the MOLD 300 is configured with certain functionalities that enable the map-developer to view various types of information about the different nodes in the layer hierarchy and the graphics style(s) associated with the various layers of the digitized map. Among other things, the map-developer may use this information to confirm modifications made to the graphical elements of the MOLD 300 when building the digitized map.

Table 1 illustrates one embodiment of the functionalities related to the summary bars and the display range bars included in the bar chart 308 that the map-developer may use to organize and modify the layers of the digitized map. As persons skilled in the art will understand, the summary bars and display range bars may be configured to enable the map-developer to select two or more such bars together such that the map-developer may modify the bars simultaneously, thereby allowing uniform modifications to be made to the selected bars.

TABLE 1

| Input Device Functions Related to Display Range Bars and Summary Bars |
|---|
| Mouse over on a bar will display the following tool tip text: "Display Range is from 1: [lower threshold] to 1: [higher threshold]." |
| Single clicking on a bar will select that bar and change its display state. |
| Double clicking on a bar will open a "layer properties" dialog with the styles tab selected and with the specified display range active. |
| Slow Double clicking on a bar will activate in-place editing of the display range (e.g. "1:5000-1:20,000"). |
| Right clicking on a bar will display the following context menu (i.e. Align left, Align right, Mate, Expand left, Expand right, Shrink left, Shrink right, \|, Cut, Copy, Paste, \|, Delete, \|, Properties). This functionality enables the map-developer to manipulate two or more bars simultaneously, thereby allowing uniform modifications to be made to the selected bar. |
| Dragging a bar will move the bar in the direction of the drag and will change the related display ranges for a layer or style set. |
| Dragging end of a bar will extend the bar in the direction of the drag and will change the related lower, or upper, threshold of the display range. |
| CTRL + Single Click will add, or remove, from the selection set. |
| SHIFT + Single Click will add, or remove, from the selection set continuously. |

Table 2 illustrates one embodiment of similar functionalities that relate to the layers set forth in the name column 302. Although the functionalities set forth in Table 2 relate to layers, in other embodiments, similar functionalities may be provided for layer groups and sub-layer groups.

TABLE 2

| Input Device Functions Related to Name Column |
|---|
| Mouse over on a layer name will display the following tool tip text: "Layer [Layer name] has [x] Style Set(s) assigned." |
| Single clicking on a layer name will select that item and change its display state. |
| Double clicking on a layer name will open a "layer properties" dialog with the name tab selected and with the name column field active. |
| Slow Double clicking on a layer name will activate a rename interface (i.e. in place editor) on that line. |
| Right clicking on a layer name will display the following context menu (i.e. Cut, Copy, Paste, \|, Delete, Rename, \|, Zoom to Layer, Properties). |

TABLE 2-continued

| Input Device Functions Related to Name Column |
| --- |
| Dragging a layer name will move the layer name in the direction of the drag and will change the related layer draw priority (i.e., the order in which the layers are superimposed when rendering the digitized map). |
| CTRL + Single Click would add, or remove, from the selection set. |
| SHIFT + Single Click would add, or remove, from the selection set continuously. |

Table 3 illustrates one embodiment of functionalities that relate to the current scale indicator 340.

TABLE 3

| Input Device Functions Related to Current Scale Indicator |
| --- |
| Mouse over on the indicator will display the following tool tip text: "Current scale is 1: [current scale]" |
| Single click and hold on the indicator will select that item and change its display state, making it possible to drag. |
| Double clicking on the indicator will open a "zoom scale" dialog. |
| Right clicking on the indicator will display the following context menu (i.e. Zoom In, Zoom Out, \|, Zoom Extents, \|, Zoom Scale, Zoom Width, \|, Zoom Previous, Zoom Next). |
| Dragging the indicator will move the indicator and change the current display scale of the digitized map. |

Once the map-developer has finished viewing and/or modifying the various layers, an OK tab 350 may be clicked to save the modifications. The MOLD 300 also includes a Cancel tab 352, which may be selected to clear an undesirable modification, and a Help tab 354, which may be selected to access various types of user-support information.

In one embodiment, all or part of the MOLD 300 may be incorporated into a map development software application, such as the map author 221 of FIG. 2. In alternative embodiments, however, all or part of the MOLD 300 may reside in a stand-alone software application that is configured to interact with a map development software application. In addition, persons skilled in the art will understand that the MOLD 300 may be configured such that any modifications made to a layer or to the organization of the layers in the MOLD 300 are automatically reflected in the digitized map through the map development software application. Similarly, the MOLD 300 may be configured such that any modifications made to a layer or to the organization of the layers using the map development software application are automatically reflected in the MOLD 300.

Figure 4:
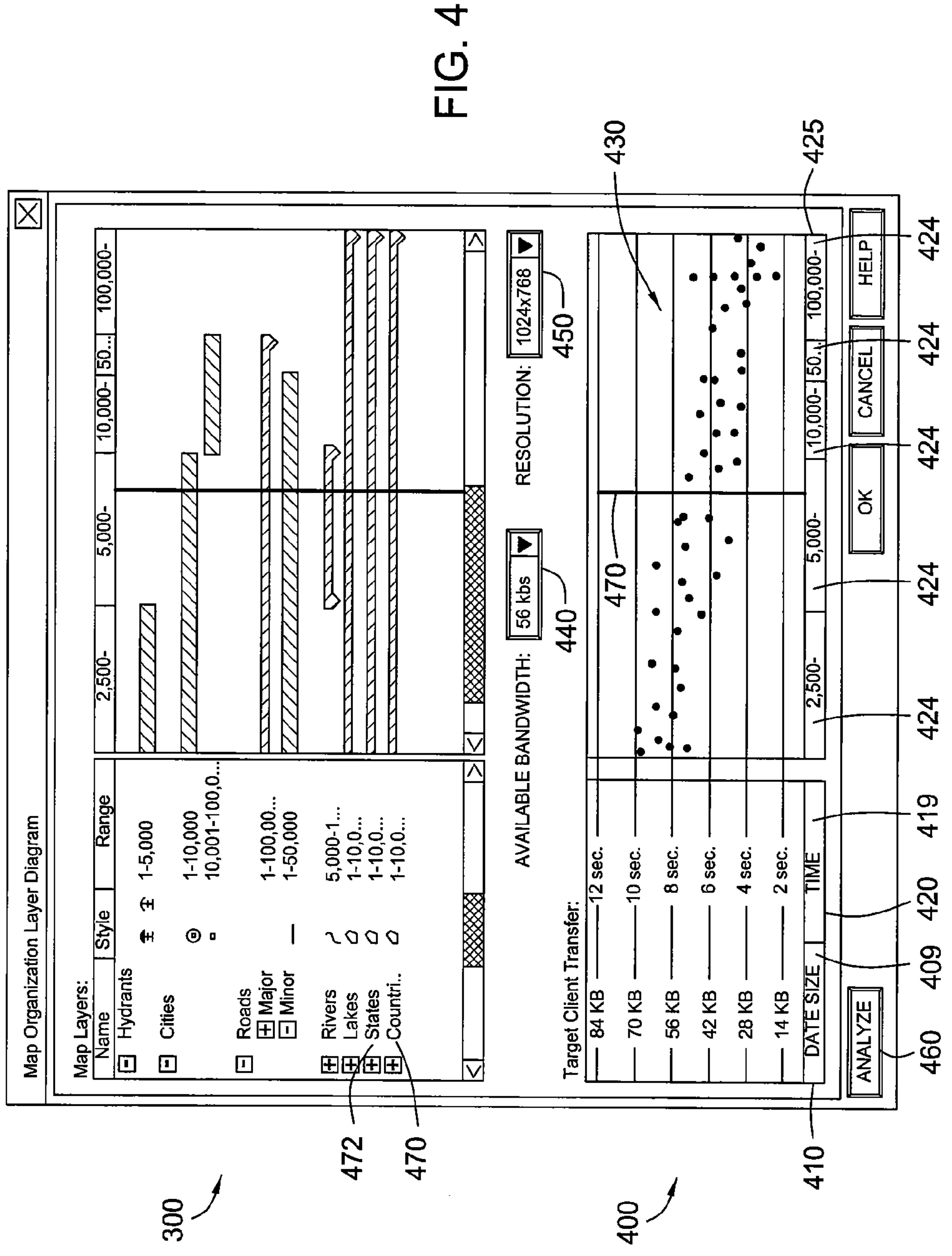
FIG. 4 illustrates the map organization layer diagram of FIG. 3 with an analyzer, according to an alternative embodiment of the invention.

FIG. 4 illustrates the map organization layer diagram 300 of FIG. 3 with an analyzer 400, according to an alternative embodiment of the invention. Together, the MOLD 300 and the analyzer 400, among other things, enable a map-developer to determine how the organization of the layers of an interactive digitized map or modifications made to those layers affect the navigational usability of the digitized map to an end-user. More specifically, and explained in further detail herein, the analyzer 400 is configured to compute the time required to download the digitized map (also referred to as "transmission time") given various inputs such as, for example, the map scale at which the digitized map is viewed by the end-user, the display screen resolution of the end-user's computing device and the available bandwidth to the end-user's computing device. In the embodiment of FIG. 4, the analyzer 400 is an integrated extension of the MOLD 300. In alternative embodiments, all or part of the analyzer 400 may reside in a stand-alone software application configured to interact with the MOLD 300 to effect the various functionalities described herein.

As shown, the analyzer 400 may include, without limitation, a data weight scale 410, a transmission time scale 420, display ranges 425, a graphical representation 430 of data weights and transmission times, a target client bandwidth selector 440, a target resolution selector 450, an analyze tab 460 and a current scale indicator 470. The data size scale 410 and the transmission time scale 420 provide vertical scales for the graphical representation 430 of the data weights and transmission times. The display ranges 425 provide the horizontal scale for the graphical representation 430 of the data weights and transmission times. In one embodiment, the display ranges 425 mirror the display ranges 310 of the MOLD 300. In alternative embodiments, however, the display ranges 425 and the display ranges 310 may be different. The graphical representation 430 of the data weights and transmission times comprises a plurality of points wherein each such point represents the data weight (i.e., the amount of data transferred to the end-user computing device) of the digitized map at a given map scale and the transmission time of that data based on the display screen resolution and the available bandwidth to the end-user's computing device. The target client bandwidth selector 440 and the target resolution selector 450 allow the map-developer to select the available bandwidth and display screen resolution, respectively, of the end-user's computing device. The analyze tab 460 allows the map-developer to request an analysis. The current scale indicator 470 is used to select the map scales for which the data weights and transmission times are computed by the analyzer 400. The current scale indicator 470 is similar to the current scale indicator 340 of the MOLD 300 and may include the same functionalities set forth above in conjunction with Table 3.

As also shown in FIG. 4, the analyzer 400 may be configured with certain other interactive features in addition to those described above. For example, the analyzer 400 includes a Data Size tab 409, which is configured to enable the map-developer to define and edit the various data weights included in the data weight scale 410, a Time tab 419, which is configured to enable the map-developer to define and edit the various transmission times in the transmission time scale 420, and display range tabs 424, which is configured to enable the map-developer to define and edit the different subsets of the display ranges 425.

To analyze the navigational usability of a digitized map with the analyzer 400, the map-developer selects the display screen resolution of the end-user's computing device using the target resolution selector 450 and the available bandwidth to the end-user's computing device using the target client bandwidth selector 440. The map-developer then selects the analyze tab 460 to initiate the analysis. The analyzer 400 is configured to select a random map scale at which the digitized map may be transmitted (i.e., the map scale at which the end-user may view the digitized map). The analyzer 400 is configured then to compute the data weight of the digitized map at the selected scale as well as the transmission time of the digitized map at the selected scale. As previously described herein, not all of the layers of the digitized map are necessarily used to render the digitized map at the selected map scale. A particular layer is used to render the digitized map at the selected map scale only if the display range associated with that layer includes the selected map scale. Persons skilled in the art will understand that the number of layers used to render the digitized map at the selected map scale, the region of the digitized map displayed at that map scale and the amount of data included in each such layer determine the data weight of the digitized map at the selected map scale. Upon completing the relevant computations, the analyzer 400 displays a point in the graphical representation 430 that indicates the data weight and the transmission time of the digitized map at the selected map scale given the selected display screen resolution and available bandwidth to the end-user's computing device. The analyzer 400 is configured to repeat this analysis for any number of randomly selected map scales within the display ranges 425. The graphical representation 430 comprises the totality of points generated and displayed by the analyzer 400.

In an alternative embodiment, shown in FIG. 4, the analyzer 400 may be configured to compute a separate data weight and transmission time for one or more different regions of the digitized map at each randomly selected map scale. The analyzer 400 may be further configured to display a separate point in the graphical representation 430 corresponding to each such region, as described above. The graphical representation 430 therefore includes multiple points for each randomly selected map scale. Such an embodiment is useful, for example, when the system transmitting the digitized map to the end-user is configured to transmit only one such region at a time for each map scale. In yet another alternative embodiment, the map-developer may select each map scale used to generate the graphical representation 430 using the current scale indicator 470.

Persons skilled in the art will understand that, in other embodiments, the analyzer 400 may be configured to consider inputs other than the display screen resolution and the available bandwidth to the end-user's computing device when computing the data weight and transmission time of the digitized map.

The map-developer may use the analyzer 400 when building the digitized map to determine whether the transmission time at any map scale exceeds a predetermined threshold that would inhibit end-users from readily accessing the digitized map (i.e., where the download time is too long). The map-developer may then use this information to either modify one or more layers of the digitized map or reorganize the layers of the digitized map to improve the transmission times. For example, the map-developer may remove information included in particular layers to decrease the data weight of the digitized map at certain map scales. The map-developer also may alter the number of layers (or the specific layers) included in the digitized map at certain map scales to decrease the data weight at those scales. For example, as shown in FIG. 4, the map-developer may notice that the data weights of the regions of the digitized map at a map scale of 1:2500 are approximately 70 KB and that the transmission times at that scale are approximately 10 seconds. The map-developer may modify the display ranges of a countries layer 470 and a states layer 472 of the digitized map such that these layers are displayed in the digitized map at the 1:2500 scale. As previously described herein, decreasing the data weight of the digitized map typically decreases the transmission time since less data is being transmitted to the end-user's computing device. Thus, removing these two layers from the digitized map should increase the transfer rate at the 1:2,500 scales. The MOLD 300 and the analyzer 400 are configured such that the map-developer may repeat the data weight/transmission time analysis and layer modification/reorganization processes until a desired result is achieved.

One advantage of the disclosed graphical user interface and analyzer is that a map-developer may efficiently organize and manage the layers of a digitized map based on the draw priority of the various layers, the graphics styles associated with each of the various layers and the ranges of map scale at which the various layers are displayed in the digitized map. Another advantage is that a map-developer may analyze data weights and transmission times of the digitized map at various map scales to determine the navigational usability of the digitized map.

The invention has been described above with reference to specific embodiments. Persons skilled in the art, however, will understand that various modifications and changes may be made thereto without departing from the broader spirit and scope of the invention as set forth in the appended claims. For example, in alternative embodiments, the MOLD 300 may be adapted for software applications other than map development software application that also deal with scale-dependant visibility, navigation (i.e., panning/zooming) and layering priorities. In addition, the MOLD 300 may be configured to include graphical or textual information about layer attributes other than display ranges, associated graphics styles or draw priority. The foregoing description and drawings are, accordingly, to be regarded in an illustrative rather than a restrictive sense.

What is claimed is:

1. A system comprising:

a graphical user interface configured to organize and manage the layers of a digitized map, the graphical user interface including:

a layer hierarchy including a first layer and a second layer, a first display range defining a first set of map scales at which the first layer is displayed in the digitized map, and a second display range defining a second set of map scales at which the second layer is displayed in the digitized map, a first graphics style representing a first map feature included in the first layer, a first summary bar corresponding to the first layer and spanning the first display range; and a display device displaying the graphical user interface.

2. The system of claim 1, wherein the graphical user interface further includes a first graphics style and a second graphics style, wherein the first graphics style and the second graphics style represent a first map feature included in the first layer.

3. The system of claim 2, wherein the graphical user interface further includes a first display range bar corresponding to the first graphics style and the second graphics style and spanning the first display range.

4. The system of claim 2, wherein the graphical user interface further includes a first summary bar corresponding to the first layer and spanning the first display range.

5. The system of claim 2, wherein the first display range includes a first subset of map scales and a second subset of map scales, and the graphical user interface further includes a first display range bar corresponding the first graphics style and spanning the first subset of map scales, and a second display range bar corresponding to the second graphics style and spanning the second subset of map scales.

6. The system of claim 1, wherein the layer hierarchy further includes a first node under which one or more layers of the digitized map are organized.

7. The system of claim 6, wherein the graphical user interface further includes a first summary bar corresponding to the first node and spanning a third display range defining a third set of map scales, the third set of map scales including each map scale at which any layer organized under the node is displayed in the digitized map.

8. The system of claim 6, wherein the first node is a layer group or a sub-layer group.

9. The system of claim 1, wherein the first layer and the second layer are arranged in the layer hierarchy based on the order in which they are superimposed when the digitized map is rendered.

10. A method for graphically organizing and managing layers of a digitized map, the method comprising:

generating a hierarchical display of layers that includes a first layer and a second layer;

displaying a first display range defining a first set of map scales at which the first layer is displayed in the digitized map based on user input; and displaying a second display range defining a second set of map scales at which the second layer is displayed in the digitized map based on user input;

displaying a first graphics style and a second graphics style, wherein the first graphics style and the second graphics style represent a first map feature included in the first layer, wherein the first display range includes a first subset of map scales and a second subset of map scales, and further comprising the step of displaying a first display range bar corresponding the first graphics style and spanning the first subset of map scales, and a second display range bar corresponding to the second graphics style and spanning the second subset of map scales.

11. The method of claim 10, wherein the hierarchical display of layers further includes a first node under which one or more layers of the digitized map are organized.

12. The method of claim 11, wherein the first node comprises a layer group or a sub-layer group.

13. A computer-readable storage medium including instructions that, when executed by a processing unit, cause the processing unit to graphically organize and manage layers of a digitized map, by performing the steps of:

generating a hierarchical display of layers that includes a first layer and a second layer;

displaying a first display range defining a first set of map scales at which the first layer is displayed in the digitized map based on user input; and displaying a second display range defining a second set of map scales at which the second layer is displayed in the digitized map based on user input;

displaying a first graphics style and a second graphics style, wherein the first graphics style and the second graphics style represent a first map feature included in the first layer, wherein the first display range includes a first subset of map scales and a second subset of map scales, and further comprising the step of displaying a first display range bar corresponding the first graphics style and spanning the first subset of map scales, and a second display range bar corresponding to the second graphics style and spanning the second subset of map scales.

14. The computer-readable storage medium of claim 13, wherein the hierarchical display of layers further includes a first node under which one or more layers of the digitized map are organized.

15. The computer-readable storage medium of claim 14, wherein the first node is a layer group or a sub-layer group.

* * * * *